United States Patent [19]
Booher

[11] Patent Number: 5,210,921
[45] Date of Patent: May 18, 1993

[54] METHOD OF EXTRUDED ALUMINUM CONTOURED BEAM FABRICATION

[76] Inventor: Howard Booher, 1871 State Rte. 44, Randolph, Ohio 44265

[21] Appl. No.: 912,248

[22] Filed: Jul. 13, 1992

[51] Int. Cl.$^5$ ............ B21K 21/16; B23P 17/00; B23P 17/04; B23K 1/20
[52] U.S. Cl. .................. 29/401.1; 29/897.2; 29/897.35; 228/173.4
[58] Field of Search .......... 29/401.1, 402.08, 897.2, 29/897.35, 897.32; 52/732, 729, 738; 228/173.4, 173.2; 280/799

[56] References Cited

U.S. PATENT DOCUMENTS

| | | | |
|---|---|---|---|
| 1,708,753 | 9/1929 | Dalton | 52/738 |
| 2,277,615 | 3/1942 | Townsend | 29/897.35 |
| 2,844,864 | 7/1958 | Schilberg | 29/897.35 |
| 3,467,408 | 9/1969 | Regalia | . |
| 3,892,423 | 7/1975 | Smith | . |
| 4,060,145 | 11/1977 | Kingman et al. | . |
| 4,877,293 | 10/1989 | French et al. | . |
| 4,907,735 | 3/1990 | Ushioda et al. | 228/173.4 |

Primary Examiner—Joseph M. Gorski
Assistant Examiner—K. V. Nguyen
Attorney, Agent, or Firm—Harpman & Harpman

[57] ABSTRACT

A method of fabricating a contoured contiguous I-beam from an extruded aluminum I-beam shape. The beam fabrication method reshaped an extruded aluminum I-beam over a contoured web insert defining a continuous load dispensing beam shaped transition within the curved portion of the beam for use in high load capacity trailer frame construction.

1 Claim, 2 Drawing Sheets

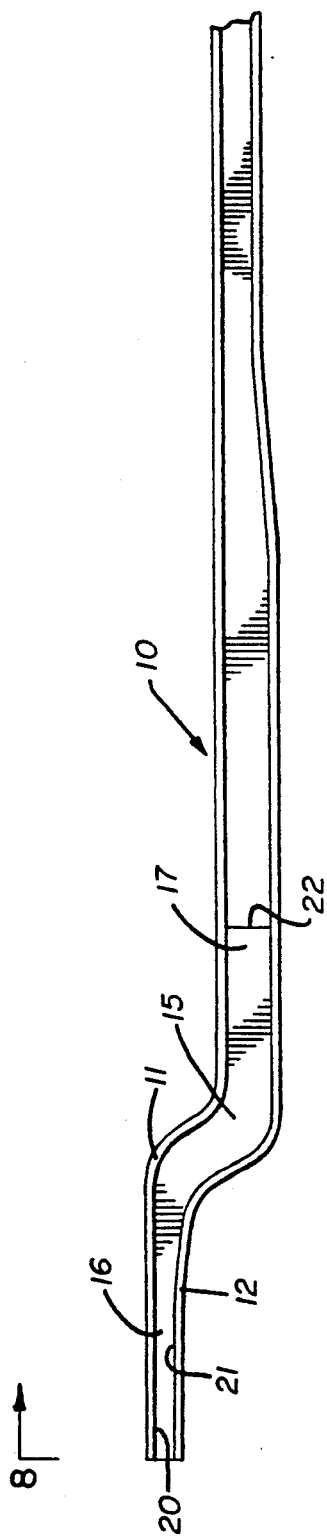
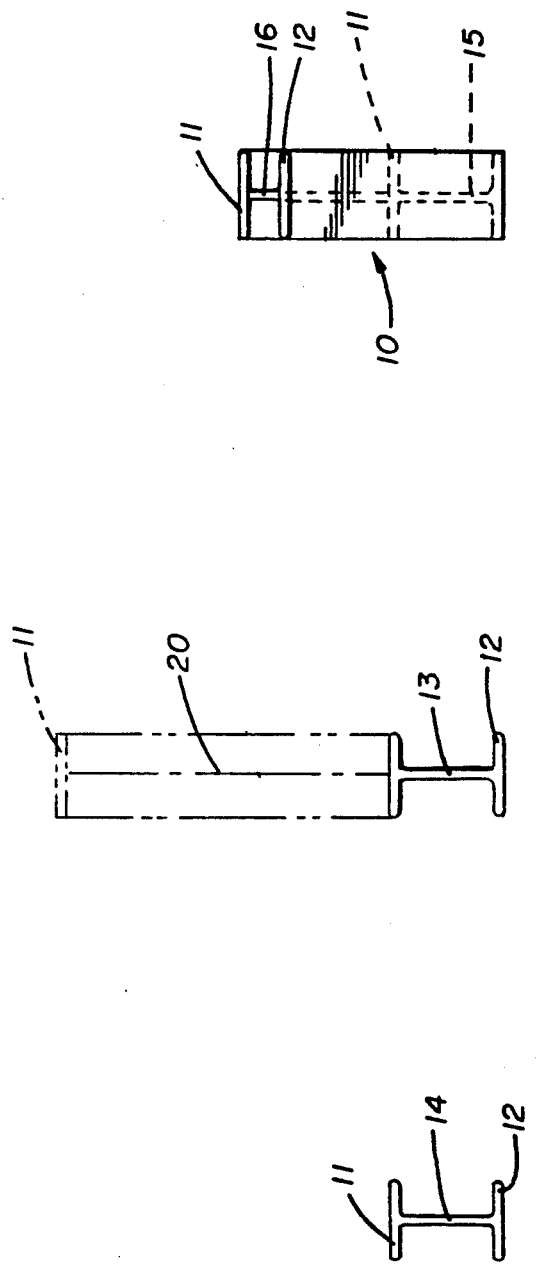

METHOD OF EXTRUDED ALUMINUM CONTOURED BEAM FABRICATION

BACKGROUND OF THE INVENTION

1. Technical Field

This beam fabrication method relates to extruded aluminum I-beams used in the construction of lightweight over the road trailer chassis that combine high load capacity trailer structures of non-corrosive aluminum frame-work elements.

2. Description of Prior Art

Prior art structures of this type have relied on a number of beam configurations fabricated out of multiple steel segments and built up trestle-like configurations, see for example U.S. Pat. Nos. 3,467,408, 3,892,423, 4,060,145 and 4,877,293.

In U.S. Pat. No. 3,467,408 a heavy duty truck trailer construction is disclosed which shows a conventional goose neck configuration which is typical of a steel fabricated multi-part frame construction for trailers and the like. The patent is directed specifically towards wheel support members which are movably positioned along a slideable beam structure at the end of the trailer configuration.

In U.S. Pat. No. 3,892,423 a trailer construction is disclosed which shows an S-shaped goose neck intermediate portion formed of box beam configurations which are curved to form the transitional area. The box beam is formed of segments secured together and in one embodiment has a secondary space railing element positioned thereabove as noted in FIG. 5 of the drawings.

In U.S. Pat. No. 4,060,145 a lift bed trailer suspension sub-frame is disclosed which is directed towards a specific lift frame configuration on the trailer structure. Ancillary to this disclosure is a typical fabricated steel goose neck or S-shaped portion of the sub-frame formed of multiple steel I-beam portions secured together with reinforcing elements to form the traditional goose neck configuration.

Finally, in U.S. Pat. No. 4,877,293 a load bridging dump trailer is disclosed which is directed towards an extensible rear section of the trailer frame which can be extended to increase the overall span of the trailer between its wheeled supports. Secondarily it shows a fabricated goose neck out of a steel construction in which the lower portion of a steel I-beam has been cut-away and then a new flange has been welded in place to form an area of reduced transverse dimension adjacent one end of the frame. The upper portion of the frame members 24 extend horizontally over the entire length of the frame and does not form a true goose neck configuration.

SUMMARY OF THE INVENTION

A method of fabricating extruded aluminum I-beams defining a contoured continuous upper and lower cords over the length of the beam. The method involved multiple steps of cutting and removing a portion of the web, bending and welding continuous upper and lower cords to pre-cut insert defining a curved I-beam configuration.

DESCRIPTION OF THE DRAWINGS

FIG. 4 is a side plan view of a completed contoured fabricated I-beam;

FIG. 6 is an enlarged end plan view of the extruded aluminum I-beam prior to fabrication;

FIG. 7 is an enlarged end plan view on lines 7—7 of FIG. 1; and

FIG. 8 is an enlarged end plan view on lines 8—8 of FIG. 4.

DESCRIPTION OF THE PREFERRED EMBODIMENT

Figure 1:
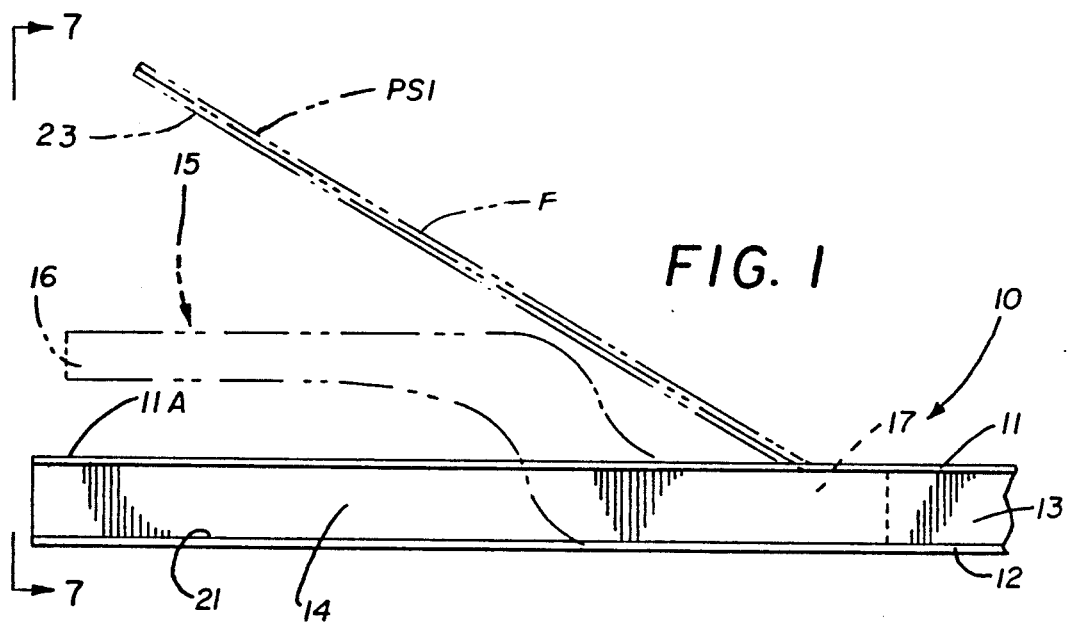
FIG. 1 is a side plan view of an extruded aluminum I-beam with a contoured web replacement portion and bent upper cord shown in dotted lines.
Figure 2:
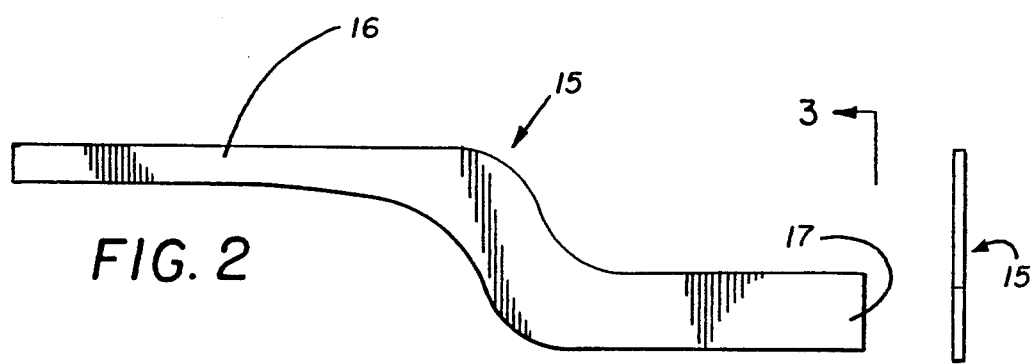
FIG. 2 is a side plan view of a contoured replacement web portion.
Figure 3:
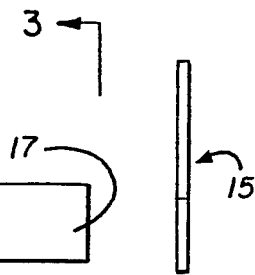
FIG. 3 is an end plan view on lines 3—3 of FIG. 2.

Referring to FIGS. 1, 2, and 3 of the drawings, a method of I-beam fabrication can be seen using an extruded aluminum I-beam 10 having a top cord 11 and a bottom cord 12 and an internal web element 13 therebetween. The extruded aluminum I-beam 10 is formed per the usual extrusion process as is well known and understood to those skilled in the art.

Figure 5:
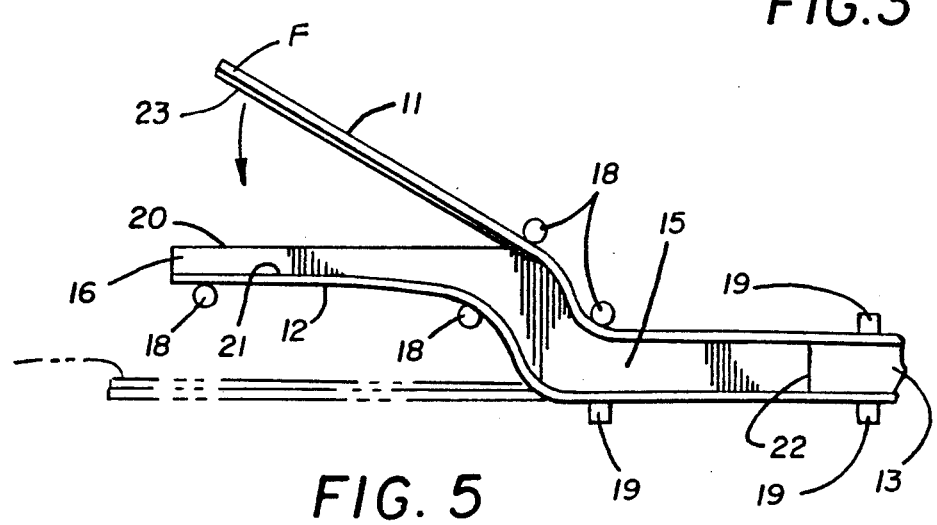
FIG. 5 is a side plan view of a portion of the extruded aluminum I-beam during fabrication.

Referring now to FIGS. 1, 5, and 6 of the drawings, the first step in I-beam fabrication wherein the extruded aluminum I-beam 10 shown in solid lines has a web portion 14 adjacent the web element 13 which is removed.

A second step of beam fabrication is bending the upper cord 11 shown in broken lines, initially up and away to position PS1 from its original position as illustrated at 11A.

A template (not shown) is used to cut a new contoured web portion 15 shown in broken lines in FIG. 1 and best seen in FIG. 2 of the drawings to a pre-determined curved configuration dependent on the use requirement.

In this example, the contoured web portion 15 is of a general longitudinally offset shape having a tapered end portion 16 and a web abutting portion 17. It will be apparent that the overall transverse dimension of the web abutting portion 17 is the same as that of the remaining web portion 13.

Referring now to FIG. 5 of the drawings, step 3 is shown wherein the extruded aluminum I-beam 10 is pre-positioned in a bending jig, shown for illustration purposes as multiple movable bending engagement points 18 and fixed positioning stops 19.

As the engagement points 18 are sequentially advanced, the upper and lower beam cords 11 and 12 are bent to conform around the contoured web portion 15 and continuously welded along the representative engagement areas 20 and 21 and the abutting end web at 22 as best seen in FIGS. 4-7 of the drawings.

It will be apparent to those skilled in art that the bending radius imparted to the upper and lower beam cords 11 and 12 adjacent the engagement points 18 respectively will not exceed acceptable manufacturing material limits in which the relative "strength" of the aluminum within the critical deformation area can be weakened by excess radius configuration.

The continuous welding along the contoured web portion 15 to the respective beam cords 11 and 12 defines an area which is spaced in relation to the beam cords 11 and 12 by leaving a small flange 23 on the respective cords when they are cut from the web portion 14. This spacing insures that the actual weld will not abut the beam cord flanges F so that a heat effective zone of the aluminum weld will not diminish the strength of respective beam cord flanges F. The completed fabricated contoured extruded aluminum I-beam with contiguous upper and lower cords 11 and 12 is illustrated in FIG. 4 of the drawings in which a compound offset curve spans and defines the transitional area therebetween providing for a simple one-piece fabrication maintaining the beam's integral strength without additional fabrication or multiple element bracing heretofore required.

Having therefore illustrated and described my invention, it will be apparent to those skilled in the art that various changes and modifications may be made therein without departing from the spirit of the invention, therefore I claim:

1. A method of fabricating a contoured extruded aluminum I-beam having a contiguous upper and lower cord with an integral web therebetween from an extruded aluminum I-beam having a top and bottom cord and a beam web portion therebetween, comprising the steps of:

a. removing a portion of the beam web portion from the extruded aluminum I-beam inwardly from its distal end, thereby freeing said top and bottom cords, and leaving a remaining portion of the beam web portion abutting said top and bottom cords,
   b. bending one of said top and bottom cords away from the other of said top and bottom cords,
   c. positioning a contoured offset replacement web portion having a tapered end portion and a web abutting portion between said top and bottom cords, such that the web abutting portion is abutted against an end of the remaining portion of the beam web portion,
   d. removably securing said top and bottom cords, said contoured offset replacement web portion, and the remaining portion of the beam web portion within a bending jig, said bending jig having movable beam engagement points and fixed beam engagement points,
   e. bending said free top and bottom cords within said bending jig against said contoured offset replacement web portion and continuously welding said free top and bottom cords to said contoured offset replacement web portion.

* * * * *